(12) United States Patent
Shinde et al.

(10) Patent No.: US 8,521,891 B1
(45) Date of Patent: Aug. 27, 2013

(54) NETWORK BROWSER SYSTEM, METHOD, AND COMPUTER PROGRAM PRODUCT FOR CONDITIONALLY LOADING A PORTION OF DATA FROM A NETWORK BASED ON A DATA TRANSFER RATE

(75) Inventors: Rajesh Shinde, Hyderabad (IN); Srikanth Chowdary Marri, Bangalore (IN)

(73) Assignee: McAfee, Inc., Santa Clara, CA (US)

( * ) Notice: Subject to any disclaimer, the term of this patent is extended or adjusted under 35 U.S.C. 154(b) by 417 days.

(21) Appl. No.: 11/766,698

(22) Filed: Jun. 21, 2007

(51) Int. Cl.
*G06F 15/16* (2006.01)

(52) U.S. Cl.
USPC .......................................... 709/230; 709/206

(58) Field of Classification Search
USPC ................................................. 709/206, 230
See application file for complete search history.

(56) References Cited

U.S. PATENT DOCUMENTS

| | | | |
|---|---|---|---|
| 5,845,084 A | 12/1998 | Cordell et al. | ........... 395/200.64 |
| 5,987,610 A | 11/1999 | Franczek et al. | |
| 6,073,142 A | 6/2000 | Geiger et al. | |
| 6,141,686 A * | 10/2000 | Jackowski et al. | ............ 709/224 |
| 6,366,947 B1 * | 4/2002 | Kavner | ........................ 709/203 |
| 6,460,050 B1 | 10/2002 | Pace et al. | |
| 6,742,047 B1 * | 5/2004 | Tso | ............... 709/246 |
| 6,892,226 B1 * | 5/2005 | Tso et al. | ...................... 709/218 |
| 7,506,155 B1 | 3/2009 | Stewart et al. | |
| 2002/0194354 A1 * | 12/2002 | Bolduc et al. | ................. 709/231 |
| 2003/0110272 A1 * | 6/2003 | du Castel et al. | ............. 709/229 |
| 2003/0233445 A1 * | 12/2003 | Levy et al. | .................... 709/224 |
| 2004/0024826 A1 * | 2/2004 | Halahmi et al. | .............. 709/206 |
| 2005/0188007 A1 * | 8/2005 | Warner et al. | ................. 709/203 |
| 2005/0216572 A1 * | 9/2005 | Tso et al. | ...................... 709/218 |
| 2005/0240940 A1 * | 10/2005 | Quinet et al. | ................. 719/315 |
| 2006/0041637 A1 * | 2/2006 | Jerrard-Dunne | ............. 709/219 |
| 2006/0294223 A1 * | 12/2006 | Glasgow et al. | ............. 709/224 |
| 2007/0283036 A1 * | 12/2007 | Dey et al. | ...................... 709/233 |

\* cited by examiner

*Primary Examiner* — Thomas Dailey
(74) *Attorney, Agent, or Firm* — Patent Capital Group

(57) ABSTRACT

A system, method, and computer program product are provided for optimizing network browser performance by conditionally loading a portion of data from a network based on a data transfer rate. In use, a data transfer rate associated with a device connected to a network is identified. Additionally, a portion of data from the network is conditionally loaded utilizing a network browser of the device, based on the identified data transfer rate. Further, the portion of the data is selected based on a relevancy of the portion of the data.

19 Claims, 7 Drawing Sheets

NETWORK BROWSER SYSTEM, METHOD, AND COMPUTER PROGRAM PRODUCT FOR CONDITIONALLY LOADING A PORTION OF DATA FROM A NETWORK BASED ON A DATA TRANSFER RATE

FIELD OF THE INVENTION

The present invention relates to data transfer, and more particularly to transferring data over a network.

BACKGROUND

Today, transferring data over a network is common practice. For example, clients connected to the network oftentimes request data from servers and/or other clients via the network. However, the speed with which such network data is capable of being transferred has traditionally been restricted due to available bandwidth constraints, connectivity constraints, etc. Attempts to minimize such speed restrictions have generally been limited to reducing the size of data transferred over the network at the server, or client, on which the data is stored (e.g. via data compression techniques, downsizing, etc.). Nevertheless, such attempts have sometimes been unsuccessful when the source of the data being transferred is itself contributing to the speed restrictions (e.g. due to operative failure of the source, etc.).

There is thus a need for addressing these and/or other issues associated with the prior art.

SUMMARY

A system, method, and computer program product are provided for optimizing network browser performance by conditionally loading a portion of data from a network based on a data transfer rate. In use, a data transfer rate associated with a device connected to a network is identified. Additionally, a portion of data from the network is conditionally loaded utilizing a network browser of the device, based on the identified data transfer rate. Further, the portion of the data is selected based on a relevancy of the portion of the data.

DETAILED DESCRIPTION

Figure 1:
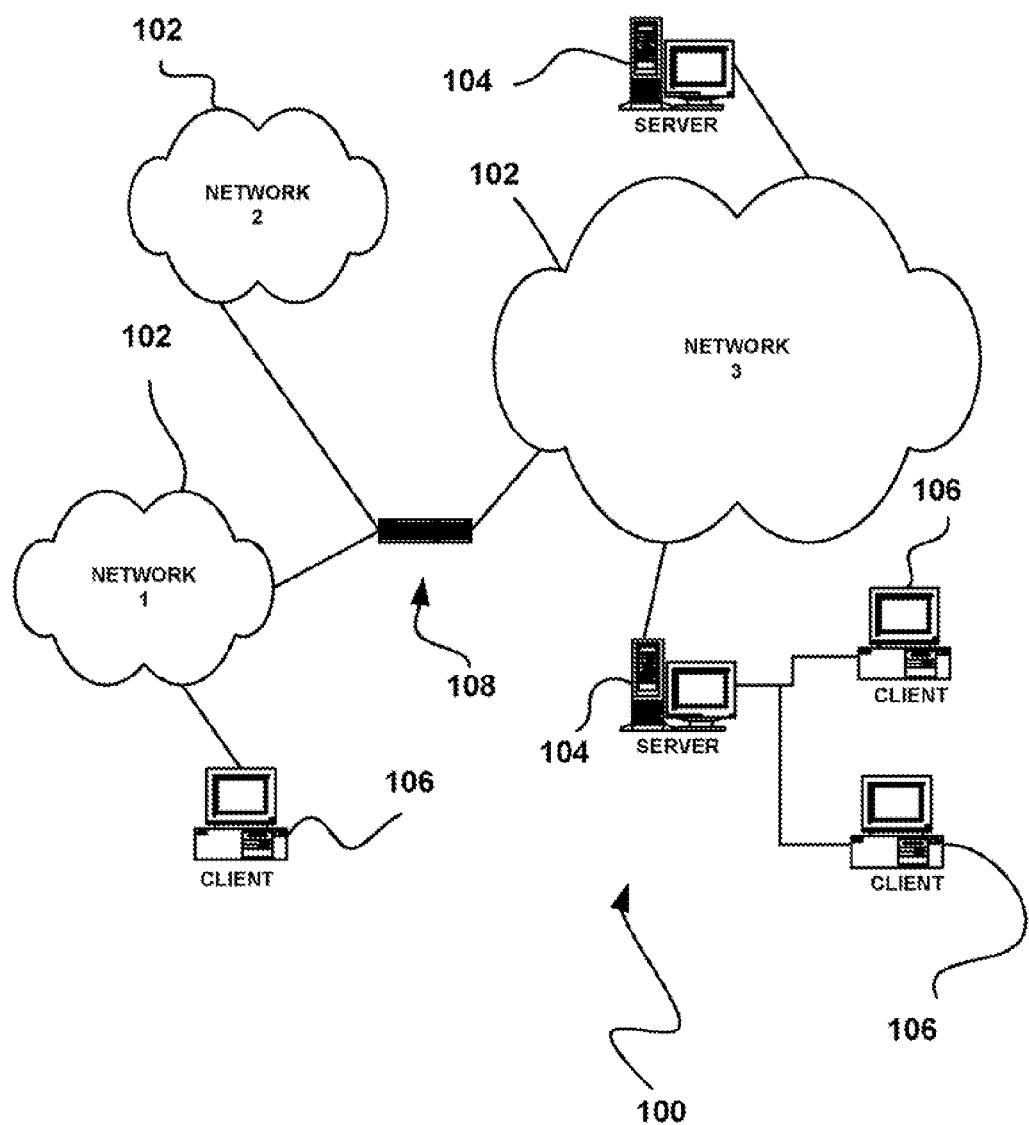
FIG. 1 illustrates a network architecture, in accordance with one embodiment.

FIG. 1 illustrates a network architecture 100, in accordance with one embodiment. As shown, a plurality of networks 102 is provided. In the context of the present network architecture 100, the networks 102 may each take any form including, but not limited to a local area network (LAN), a wireless network, a wide area network (WAN) such as the Internet, a peer-to-peer network, a personal area network (PAN), etc.

Coupled to the networks 102 are servers 104 which are capable of communicating over the networks 102. Also coupled to the networks 102 and the servers 104 is a plurality of clients 106. Such servers 104 and/or clients 106 may each include a desktop computer, lap-top computer, hand-held computer, mobile phone, personal digital assistant (PDA), peripheral (e.g. printer, etc.), any component of a computer, and/or any other type of logic. In order to facilitate communication among the networks 102, at least one gateway 108 is optionally coupled therebetween.

Figure 2:
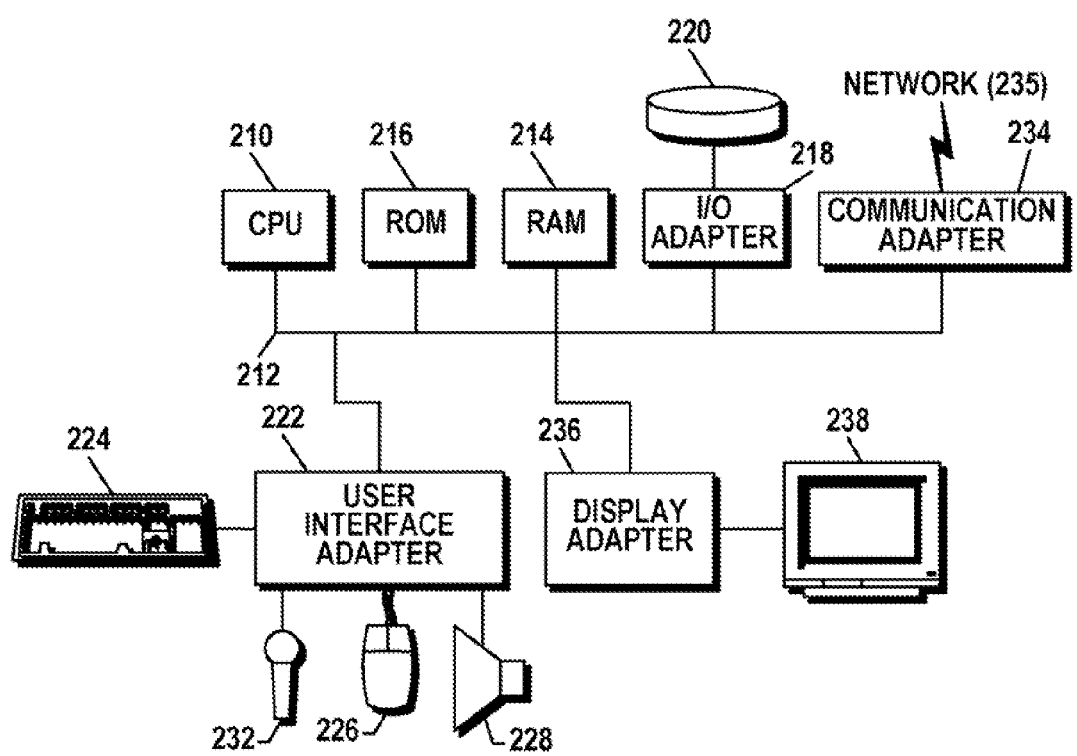
FIG. 2 shows a representative hardware environment that may be associated with the servers and/or clients of FIG. 1, in accordance with one embodiment.

FIG. 2 shows a representative hardware environment that may be associated with the servers 104 and/or clients 106 of FIG. 1, in accordance with one embodiment. Such figure illustrates a typical hardware configuration of a workstation in accordance with one embodiment having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen (not shown) to the bus 212, communication adapter 234 for connecting the workstation to a communication network 235 (e.g., a data processing network) and a display adapter 236 for connecting the bus 212 to a display device 238.

The workstation may have resident thereon any desired operating system. It will be appreciated that an embodiment may also be implemented on platforms and operating systems other than those mentioned. One embodiment may be written using JAVA, C, and/or C++ language, or other programming languages, along with an object oriented programming methodology. Object oriented programming (OOP) has become increasingly used to develop complex applications.

Of course, the various embodiments set forth herein may be implemented utilizing hardware, software, or any desired combination thereof. For that matter, any type of logic may be utilized which is capable of implementing the various functionality set forth herein.

Figure 3:
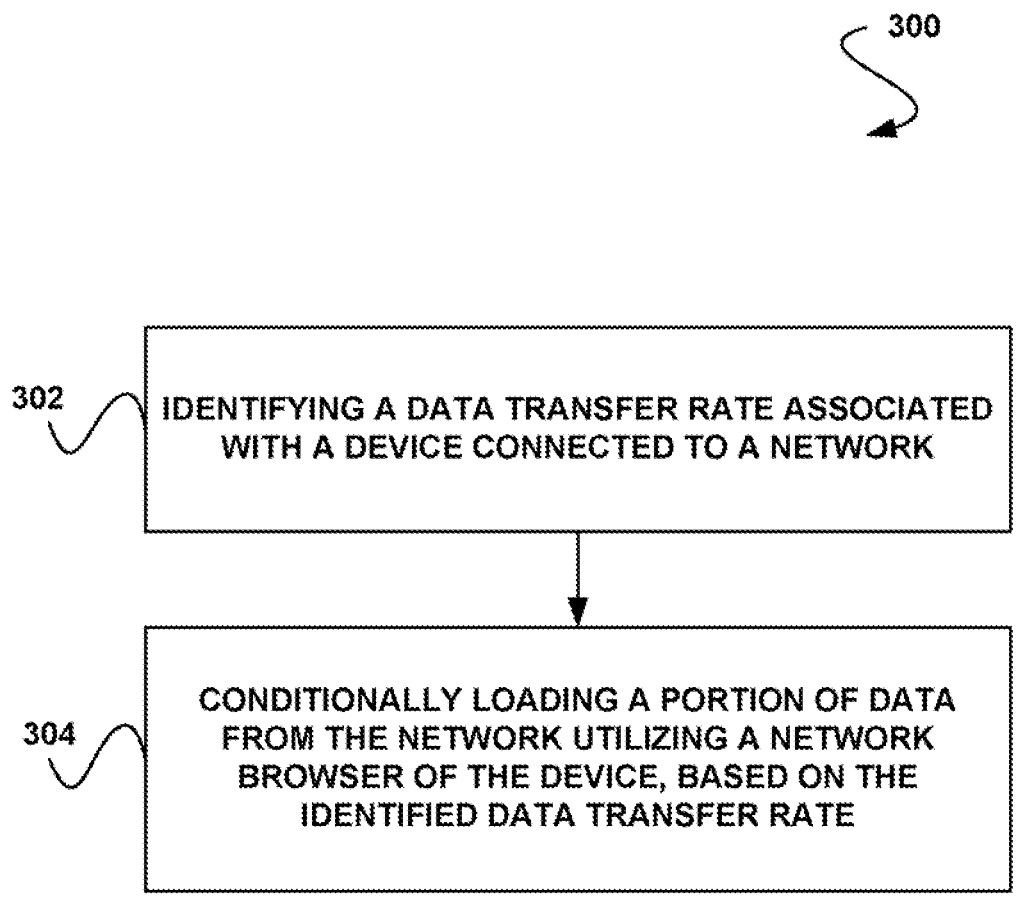
FIG. 3 shows a method for conditionally loading a portion of data from a network based on a data transfer rate, in accordance with one embodiment.

FIG. 3 shows a method 300 for conditionally loading a portion of data from a network based on a data transfer rate, in accordance with one embodiment. As an option, the method 300 may be carried out in the context of the architecture and environment of FIGS. 1 and/or 2. Of course, however, the method 300 may be carried out in any desired environment.

As shown in operation 302, a data transfer rate associated with a device connected to a network is identified. In the context of the present description, the device may include any device connected to the network that is capable of loading data. Just by way of example, the device may include any of the devices described above with respect to FIGS. 1 and/or 2.

In addition, the network to which the device is connected may include any network over which data may be transferred (e.g. communicated, downloaded, etc.). For example, the network may include a wireless network, the Internet and/or any of the other networks described above with respect to FIG. 1. In various embodiments, the network may include a mobile phone network for enabling communication between mobile phones, a business network utilized by an organization (e.g. company, etc.), a home network, a personal network for enabling communication between a computer and peripheral devices associated therewith, etc. In this way, the device may be wirelessly connected to the network, etc.

Further, the network may utilize any desired communication protocols. In various embodiments, the network may utilize radio frequency (RF), infrared (IR), ultrasound, electromagnetic communications, etc. Thus, in one embodiment, the data transfer rate associated with the device may indicate a speed with which data is transferred to the device via the network. For example, such speed may be indicated in terms of the communication protocol utilized in transferring the data over the network.

Moreover, in one embodiment, the data transfer rate may be identified utilizing a network adapter. Optionally, the network adapter may continuously monitor the data transfer rate associated with the device for the identification thereof. In another embodiment, the data transfer rate may be identified based on a time between issuance of a request by the device over the network and receipt of a response to the request by the device (e.g. from another device on the network, etc.). Of course, however, the data transfer rate may be identified in any desired manner.

As also shown, a portion of data is conditionally loaded from the network utilizing a network browser of the device, based on the identified data transfer rate. Note operation 304. The network browser may include any application on the device that is capable of loading data from the network. Such loading may include any type of transferring of the data to the network browser. Just by way of example, the network browser may include a web browser, in one embodiment. Further, the network browser may be utilized for presenting the loaded data to a user of the device.

Additionally, the data may include any information, content, etc. capable of being loaded from the network utilizing the network browser. In one embodiment, the data may include a web page. In other embodiments, the data may include messages, such as, for example, an electronic mail (email) message, a short message service (SMS) message, an instant message, etc. In still yet another embodiment, the data may include a computer program to be installed, an update to a computer program on the device, etc.

To this end, the portion of the data may include images, video, audio, advertisements, third party plug-ins (e.g. run time environment plug-in applications, etc.) and/or any other portion (e.g. segment, subpart, fraction, etc.) of the data. Just by way of example, the data (and the portions thereof) may be formatted and/or written utilizing any desired language/format such as hypertext markup language (HTML), extensible hypertext markup language (XHTML), cascading style sheets (CSS), JavaScript, dynamic hypertext markup language (DHTML), extensible markup language (XML), Java™ MIDlets, extensible stylesheet language (XSL), extensible stylesheet language transformation (XSLT), resource description framework site summary (RSS), asynchronous JavaScript and XML (AJAX), active server pages (ASP), etc.

Furthermore, the portion of the data is selected based on a relevancy of the portion of the data. In the context of the present description, the relevancy may include relevancy with respect to any aspect of the data, hardware and/or software of the device, and/or a user, etc. In one embodiment, the portion of the data may be selected from a plurality of different portions of the data. Still yet, such relevancy may include, as an option, the pertinence of the portion of the data with respect to any of the other portions of the data. In this way, the least relevant portion may be selected. Optionally, the relevancy may include a value, weight, and/or any other indicator of the relevancy of the portion of the data.

In one embodiment, the relevancy may be identified based on rules. Such rules may specify a relevancy hierarchy of data portion types. For example, advertisements may be specified as least relevant to data being loaded, whereas text, input fields, etc. may be specified as most relevant to data being downloaded.

In one embodiment, the rules may be manually configured. For example, the rules may be user-configured. In another embodiment, the rules may be automatically configured. As an option, the rules may be configured automatically based on capabilities of the device. Just by way of example, the rules may specify types of data portions (e.g. types of images, etc.) which the device is not necessarily adapted to process (e.g. display, render, etc.).

As another option, the rules may be configured automatically based on different types of applications (e.g. installed on the device, etc.). For example, relevancy of different data portion types may be specified with respect to various applications. Just by way of example, text within email messages accessed utilizing an email application may be specified as a higher relevancy than images within such email messages. Thus, the relevancy of the portion of the data may be based on an application associated with the data.

Furthermore, in one embodiment, the portion of the data may be conditionally loaded, if the identified transfer rate meets a predefined threshold rate. For example, a data transfer threshold rate may be predefined (e.g. user-configured, automatically configured, etc.), such that the identified data transfer rate may be compared to such threshold. In response to a determination that the identified transfer rate meets or is higher (e.g. faster) than the threshold rate (based on a comparison), the portion of the data is loaded. Thus, the portion of the data may be loaded, such that all of the data is loaded.

In another embodiment, the portion of the data may be prevented from being loaded, if the identified data transfer rate is below a predefined threshold rate. In response to a determination that the identified data transfer rate is lower (e.g. slower) than the threshold rate (based on a comparison), the portion of the data may be prevented from being loaded.

In this way, the size of the data being loaded may be decreased by preventing the loading of a portion thereof, while loading the remaining portions of the data. Accordingly, decreasing the size of the data being loaded may reduce an amount of time required to load the remaining portions of the data (i.e. the entire data less the portion prevented from loading).

More illustrative information will now be set forth regarding various optional architectures and features with which the foregoing technique may or may not be implemented, per the desires of the user. It should be strongly noted that the following information is set forth for illustrative purposes and should not be construed as limiting in any manner. Any of the following features may be optionally incorporated with or without the exclusion of other features described.

Figure 4:
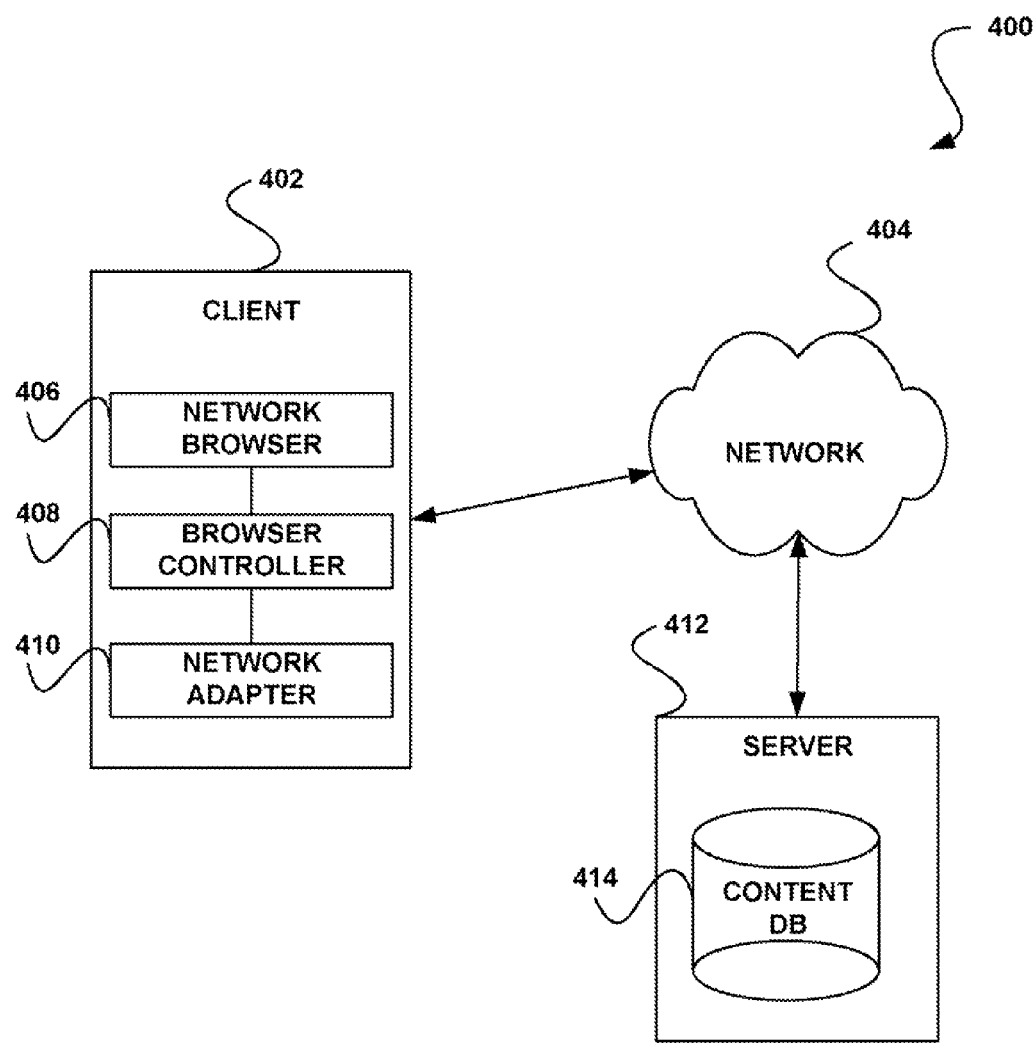
FIG. 4 shows a system for conditionally loading a portion of data from a network based on a data transfer rate, in accordance with another embodiment.

FIG. 4 shows a system 400 for conditionally loading a portion of data from a network based on a data transfer rate, in accordance with another embodiment. As an option, the system 400 may be implemented in the context of the architecture and environment of FIGS. 1-3. Of course, however, the system 400 may be implemented in any desired environment. It should also be noted that the aforementioned definitions may apply during the present description.

As shown, a client 402 is in communication with a server 412 via a network 404. While only a single client 402 and server 412 are shown, it should be noted that the client 402 may also optionally be in communication with a plurality of different servers and/or other clients via the network 404. In addition, the network 404 may include a single network, as shown, but, of course, may also include any combination of networks by which the client 402 and the server 412 communicate.

As also shown, the server 412 includes a content database 414. The content database 414 may include any data structure capable of being utilized for storing data. Further, in the context of the present embodiment, at least some of such data is capable of being transferred to the client 402. For example, the content database 414 may store web pages, email message, etc.

In use, the network adapter 410 of the client 402 is utilized for communicating with the server 412 over the network 404. To this end, the network adapter 410 may be capable of sending and receiving data over the network 404. The network adapter 410 may be specific to the network 404. For example, if the network 404 includes a wireless network, the network adapter 410 may include a wireless network adapter (e.g. RF adapter, etc.). Of course, however, the network adapter 410 may also include any other type adapter that is adapted for facilitating communication over the network 404.

Additionally, the browser controller 408 of the client 402 is in communication with the network adapter 410. In this way, the browser controller 408 may identify data transfer rates associated with the network adapter 410 of the client 402. As an option, the browser controller 408 may continuously monitor such data transfer rates.

In one embodiment, the data transfer rates may be identified based on a difference between a time a request is issued by the client 402 via the network adapter 410 and a time a response to the request is received by the client 402 via the network adapter 410. Thus, the browser controller 408 may include logic for determining the data transfer rates. Of course, it should be noted that the browser controller 408 may identify the data transfer rates in any desired manner.

Further, the browser controller 408 may include an application installed on the client 402. In one embodiment, the browser controller 408 may be integrated with the network browser 406 of the client 402 (e.g. as an add-on, plug-in, etc.). Of course, however, the browser controller 408 may also include an application that operates independently with respect to the network browser 406 of the client 402, while remaining in communication with such network browser 406, as shown. As another option, the browser controller 408 may be integrated with other applications, such as, for example, applications (e.g. customized corporate applications, etc.) utilized for connecting to various networks.

Still yet, the browser controller 408 may be utilized for controlling the network browser 406. For example, commands (e.g. instructions, etc.) issued by the browser controller 408 to the network browser 406 may take precedence over operations of the network browser 406. Such commands issued by the browser controller 408 may include commands preventing loading of data from the content database 414 of the server 412 via the network 404 utilizing the network browser 406, for example.

To this end, the browser controller 408 may identify data transfer rates of the client 402, and may control the network browser 406 based thereon. For example, in one embodiment, the browser controller 408 may identify a request issued by the client 402 via the network browser 406 (e.g. user initiated request, etc.) for data from the content database 414 of the server 412. In response, the browser controller 408 may identify a data transfer rate (e.g. a latest determined data transfer rate, etc.) associated with the network adapter 410 of the client 402.

The browser controller 408 may further conditionally allow loading of an entirety of the requested data based on the identified data transfer rate. For example, the browser controller 408 may compare the identified data transfer rate to a predefined data transfer threshold rate. If the browser controller 408 determines that the identified data transfer rate meets or exceeds the threshold rate, the browser controller 408 may passively allow the network browser 406 to load an entirety of the requested data, but of course, in another embodiment, may also instruct the network browser 406 to load the entirety of the requested data.

If, however, the browser controller 408 determines that the identified data transfer rate is lower than the threshold rate, the browser controller 408 may automatically begin issuing commands associated with an optimized mode. In particular, the browser controller 408 may command the network browser 406 to prevent loading of a portion of the requested data, where such portion is selected based on a relevancy thereof. In one embodiment, the browser controller 408 may select the portion of the data based on the relevancy. In another embodiment, the network browser 406 may select such portion of the data based on the relevancy. As an option, the client 402 may store relevancy rules utilized in selecting the portion of the data. In one possible embodiment, such relevancy-based selection may be conducted by first gathering information about the portions of the data such as the size, extension, format, etc., and then applying such rules to this information, prior to loading. To this end, the browser controller 408 may be utilized for controlling the network browser 406 to conditionally load a portion of data from the content database 414 of the server 412 over the network 404.

As an option, the browser controller 408 may create a log file. The log file may record commands issued by the browser controller 408, data transfer rates associated with the network adapter 410, an amount of data transferred via the network adapter 410, a date and/or time of each data transfer, etc. For example, the log file may be utilized for billing purposes by a service provider that provides network access to the client 402.

As another option, the browser controller 408 may be utilized for scheduling downloads of data to the client 402 over the network 404. Thus, the browser controller 408 may queue data downloads requested by the client 402. In one embodiment, such downloads may be queued when the data transfer rate associated with the network adapter 410 is below the predetermined threshold.

As still yet another option, the browser controller 408 may communicate a notification to a user of the client 402 when a plurality of windows associated with the network browser 406 are concurrently open (e.g. being utilized for presenting data), but when the user requests data over the network 404 which requires additional bandwidth for transfer to the client 402. For example, such notification may prompt the user to close at least some of the windows. In this way, additional bandwidth may be provided for fulfilling the user request for data.

Figure 5:
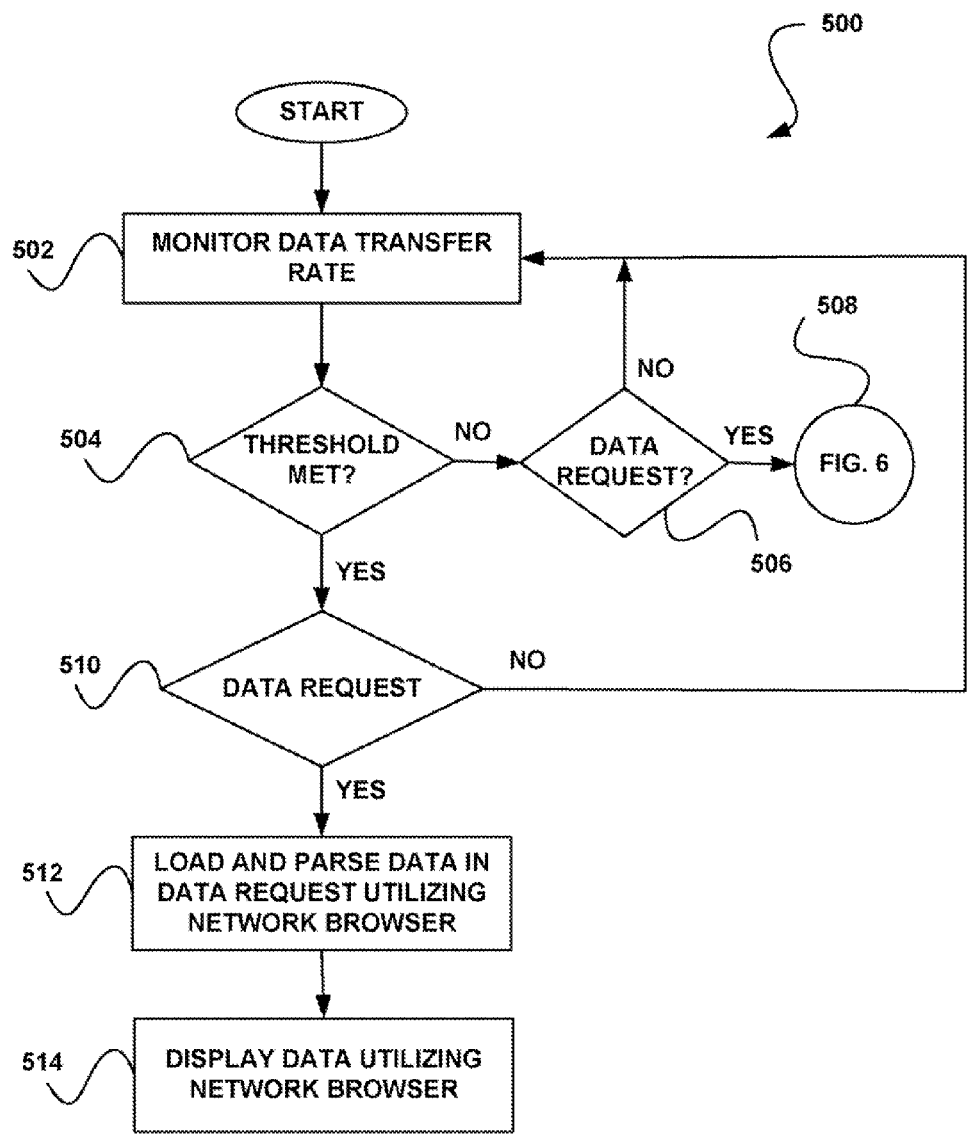
FIG. 5 shows a method for loading requested data utilizing a network browser based on a data transfer rate, in accordance with yet another embodiment.

FIG. 5 shows a method 500 for loading requested data utilizing a network browser based on a data transfer rate, in accordance with yet another embodiment. As an option, the method 500 may be carried out in the context of the architecture and environment of FIGS. 1-4. Of course, however, the method 500 may be carried out in any desired environment. Again, it should also be noted that the aforementioned definitions may apply during the present description.

As shown in operation 502, data transfer rates associated with a device are monitored. The data transfer rates may be monitored continuously, in one embodiment. As another option, such data transfer rates may be monitored periodically (e.g. based on configured time periods, etc.).

In response to identification of a data transfer rate of the device from such monitoring, it is determined whether a data transfer threshold rate has been met. Note decision 504. Such determination may be made by comparing the latest identified data transfer rate with the threshold rate. Of course, the determination may also be made utilizing any data transfer rate of the device (e.g. an average of data transfer rates for a particular period of time, etc.).

If it is determined that threshold rate has not been met, it is determined whether data has been requested by the device. Note decision 506. In one embodiment, the data may be requested by a user entering a universal resource locator (URL) associated with the data into a web browser. Of course, however, the data may be requested in any desired manner.

In response to a determination that data has been requested, such data request is processed according to the operations of FIG. 6, as described below. See operation 508. For example, the operations of FIG. 6 may allow the data request to be processed in a manner that decreases a size of the data requested, for further reducing the time in which such request is fulfilled (e.g. by loading a lesser amount of data, etc.). If a data request has not been made by the device, data transfer rates continue to be monitored (operation 502).

If, in decision 504, it is determined that the threshold rate has been met, it is further determined whether data has been requested by the device. Note operation 510. In response to a determination that data has been requested, an entirety of the requested data is loaded and parsed utilizing a network browser, as shown in operation 512. For example, the requested data may be loaded and parsed from a network.

In one embodiment, the data may be loaded by transferring the data to the network browser. In another embodiment, the data may be parsed by analyzing the data. For example, the data may be analyzed for determining an output format for the data. To this end, the data is displayed utilizing the network browser, as shown in operation 514. For example, the data may be displayed in a window of the network browser utilizing a display of the device. Thus, all of the data requested by the device may be displayed, in response to a determination that a data transfer rate of the device meets a predefined threshold rate.

Figure 6:
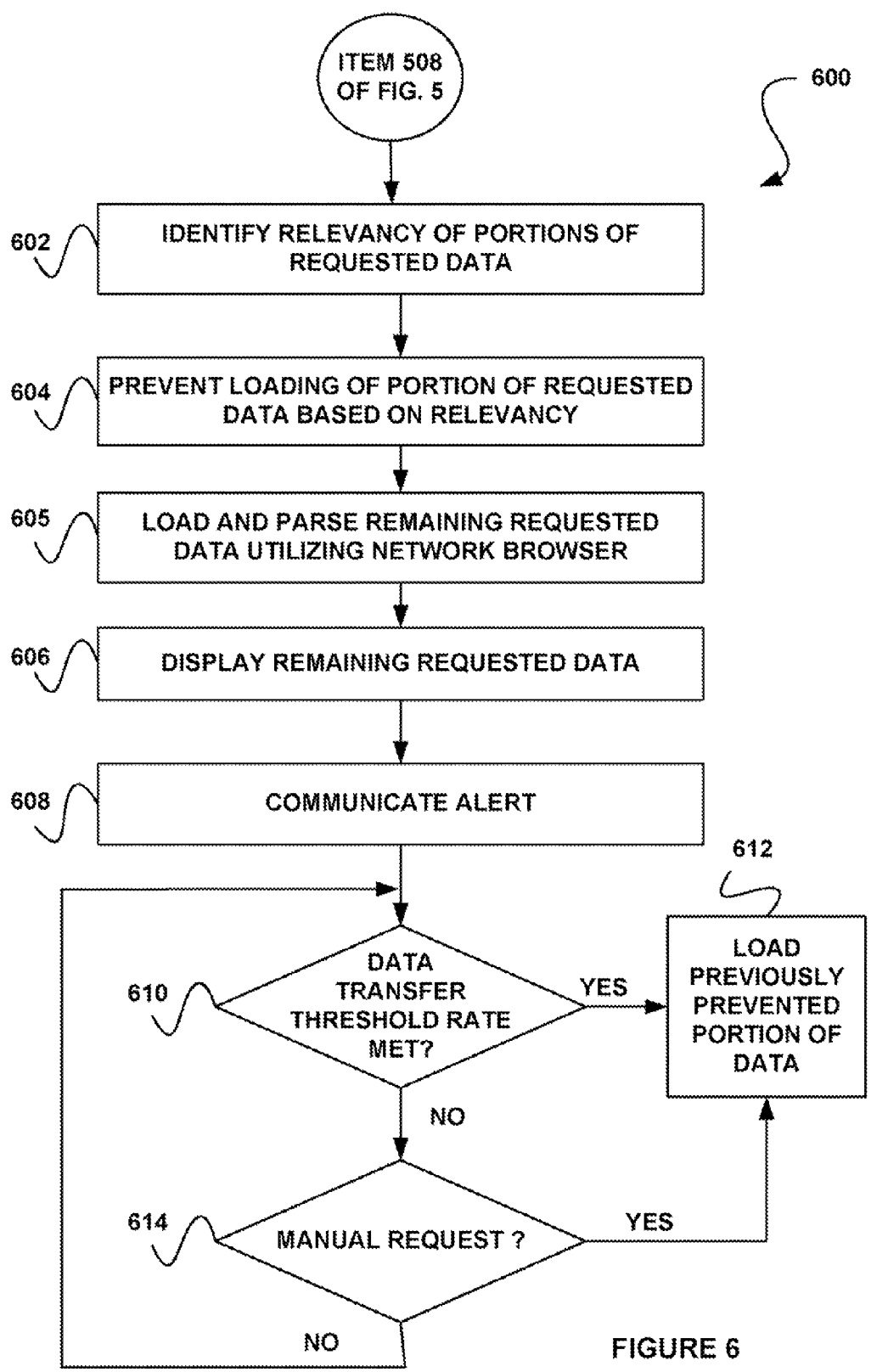
FIG. 6 shows a method for preventing loading of a portion of requested data based on a data transfer rate that is not determined to meet a data transfer threshold rate, in accordance with still yet another embodiment.

FIG. 6 shows a method 600 for preventing loading of a portion of requested data based on a data transfer rate that is not determined to meet a data transfer threshold rate, in accordance with another embodiment. As an option, the method 600 may be carried out in the context of the architecture and environment of FIGS. 1-5. For example, the method 600 may be carried out in the context of operation 508 of FIG. 5. Of course, however, the method 600 may be carried out in any desired environment. It should also be noted that the aforementioned definitions may apply during the present description.

As shown in operation 602, a relevancy of portions of requested data is identified. In the context of the present embodiment, the relevancy is determined for each of the portions of requested data. In addition, loading of at least one portion of the requested data is prevented based on the identified relevancies. Note operation 604.

In one embodiment, loading of a portion of the requested data associated with the lowest relevancy may be prevented. In another embodiment, loading of any portions of the requested data associated with a relevancy that is below a predefined relevancy threshold may be prevented. For example, such relevancy threshold may be predefined by user. In this way, a single portion of the requested data may be prevented from being loaded, or, in another embodiment, a plurality of portions of the requested data may be prevented from being loaded, based on relevancies thereof.

Further, the remaining requested data is loaded and parsed, utilizing a network browser, as shown in operation 605. In the context of the present embodiment, the remaining requested data may include portions of the data excluded from the portions of the data prevented from being loaded. Thus, any data permitted to be loaded based on an associated relevancy is loaded and parsed utilizing the network browser.

Moreover, as shown in operation 606, the remaining requested data is displayed. To this end, a portion of data may be prevented from being loaded utilizing the network browser, in response to a determination that a data transfer rate of an associated device has not met a threshold rate. In this way, the size of data loaded may be lessened for decreasing latency associated with the loading of such data.

As also shown in operation 608, an alert is communicated. Thus, the alert may be communicated, in response to preventing the loading of the portion of the data. In one embodiment, the alert may be communicated in association with the display of the remaining requested data. For example, the alert may be communicated via a window in which the remaining requested data is displayed. In such example, the alert may be communicated by changing a color of the network browser. In another embodiment, the alert may be displayed utilizing a pop-up window that is separate from the display of the remaining requested data. In yet another embodiment, the alert may be displayed in a tool bar menu of the network browser.

Such alert may be utilized to indicate that the portion of the data has been prevented from being loaded, in one embodiment. In another embodiment, the alert may be utilized to indicate whether the data transfer rate has met a threshold rate. Such alert may include an image, text, audio, etc. Optionally, the alert may be configured by a user. For example, the mode of communication associated with the alert may be configured, an option may be provided for disabling the alert, etc.

In this way, the alert may optionally inform a user of the network browser, if requested data is unavailable for loading, if data transfer rates are below a predefined threshold rate, etc. Thus, the user may opt to retry requesting the data at a later time (e.g. when data transfer rates increase above the threshold rate, etc.).

Still yet, it is determined whether another data transfer rate identified during or subsequent to the loading of the remaining requested data meets the threshold rate, as shown in decision 610. In this way, such determination may be made even after, or during, display of the remaining requested data. If it is determined that the other identified data transfer rate meets the threshold rate, the previously prevented portion of data is loaded. Note operation 612.

Further, such loaded data may be parsed and displayed (not shown). To this end, once it is determined that the data transfer rate has met the threshold rate, any previously unloaded data may be loaded automatically. If, however, it is determined that the other identified data transfer rate still does not meet the threshold rate, it may further be determined whether a manual request to load the previously prevented portion of data has been received. Note decision 614.

The manual request may be initiated by a user, for example. In various embodiments, such manual request may be initiated by selecting and right-clicking, double clicking, etc. the display area where the portion of the data would otherwise have been displayed, utilizing a mouse device. In addition, such manual request may be initiated utilizing the network browser via which the remaining requested data is displayed (see operation 606). In this way, in one embodiment, the manual request to load any unloaded data may be received in response to the display of the remaining requested data. As an option, if multiple portions of the data were previously prevented from being loaded, the manual request may specify any or all of such portions to be loaded.

If it is determined that a manual request has been received, the previously prevented portion of data indicated by the manual request may be loaded, as shown in operation 612. Accordingly, in response to the portion of the data being prevented from loading based on the identified data transfer rate, such portion of the data may be loaded based on a manual request. Thus, all requested data (or a selected portion thereof) may be displayed in response to a manual request, even if the data transfer threshold rate has not been met.

In one exemplary embodiment, a user may request a web page over a network utilizing a network browser of a device, when a data transfer rate associated with the device is below a predetermined threshold rate. In the context of the present exemplary embodiment, such web page may include a web page for allowing the user to log into a web site. In response to the request, a relevancy of each of the portions of the web page may be identified.

For example, images within the web page may be assigned a lower relevancy than fields for inputting a user name and password. Thus, the images may be prevented from being loaded, whereas the fields may be loaded and parsed utilizing the network browser. In this way, the portions of the data most relevant to the request may be loaded in the network browser for display to the user. In addition, an alert may be communicated to the user for indicating that the prevented images were not loaded utilizing the network browser. The user may further manually request for such prevented images to be loaded, or such prevented images may be automatically loaded in response to a determination that the data transfer rate has met the threshold rate.

Figure 7A:
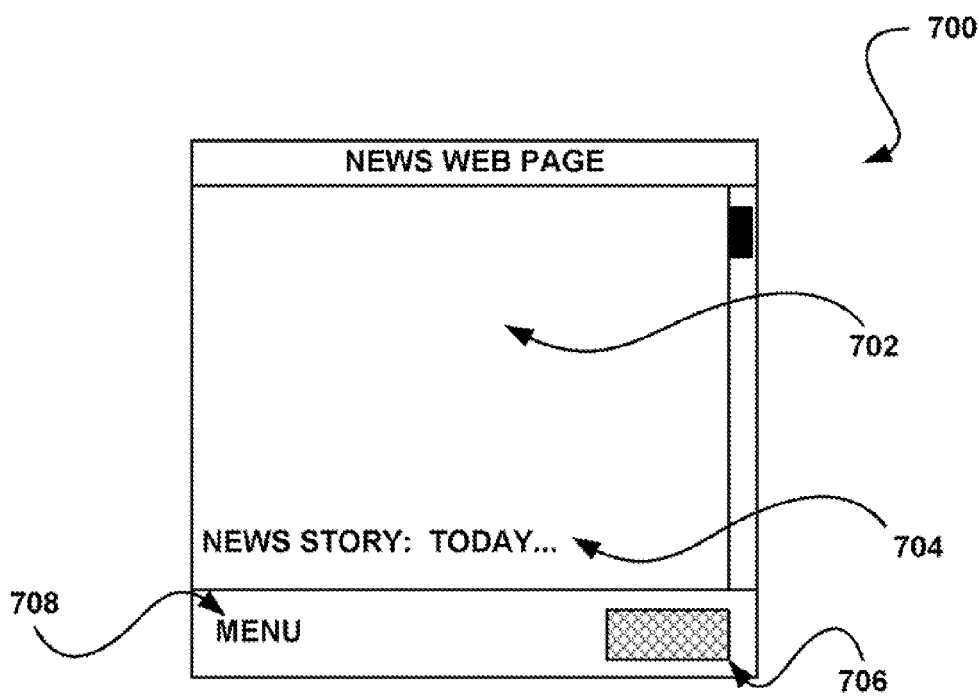
FIG. 7A shows a graphical user interface in which a portion of requested data is prevented from loading, in accordance with another embodiment.

FIG. 7A shows a graphical user interface (GUI) 700 in which a portion of requested data is prevented from loading, in accordance with yet another embodiment. As an option, the GUI 700 may be implemented in the context of the architecture and environment of FIGS. 1-6. Of course, however, the GUI 700 may be implemented in any desired environment. It should also be noted that the aforementioned definitions may apply during the present description.

As shown, the GUI 700 is utilized to display data requested by a user over a network. The GUI 700 may include a window of a web browser, for example In the present embodiment, the requested data includes a web page for new content, as shown. Of course, however, the requested data may also include any other type of data.

In response to a determination that a data transfer rate of an associated device is lower than a predefined threshold rate, a portion of the requested data is prevented from loading utilizing the network browser. In the present embodiment, the portion of the data prevented from being loaded may include an image, for example. As shown, the display area of the GUI 700 associated with the prevented portion of the data (see item 702) is prevented from being populated with such portion of the data. However, the remaining portion of the data, which, in the present embodiment, includes a text portion of the requested data 704, is displayed.

Moreover, a menu 708 of the GUI 700 may be utilized for manually selecting to load the previously prevented portion of the data. In addition, a status indicator 706 is also displayed via the GUI 700. The status indicator 706 may be utilized for indicating that a portion of the requested data has been prevented from being loaded. As another option, the status indicator 706 may be utilized for indicating whether a data transfer rate associated with the device meets a predefined threshold rate.

In one embodiment, the status indicator 706 may change color. For example, the status indicator 706 may be of a blue color if the data transfer rate associated with the device is lower than the threshold rate. As another example, the status indicator 706 may be of a red color if the data transfer rate is zero (e.g. indicating a communication signal utilized by the device is disabled, etc.). As yet another example, the status indicator 706 may be of a green color if the data transfer rate meets or exceeds the threshold rate.

Of course, however, the status indicator 706, including utilized colors, etc. may also be customized by a user. In one embodiment, the status indicator 706 may be configured by the user during installation of a browser controller utilized to control a browser associated with the GUI 700. In another embodiment, the status indicator 706 may be configured by selecting a configuration option on the menu 708.

As yet another option, the GUI 700 may be utilized for displaying information describing the portion of the data prevented from being loaded. For example, the menu 708 of the GUI 700 may include an option for displaying such descriptive information. Still yet, the GUI 700 may display a current data transfer rate associated with the device, as an option. Moreover, in response to identification that the data transfer rate has changed from meeting the threshold rate to being below the threshold rate, a message may be communicated (e.g. via the GUI 700) indicating such change, and that portions of requested data may be prevented from being loaded.

Figure 7B:
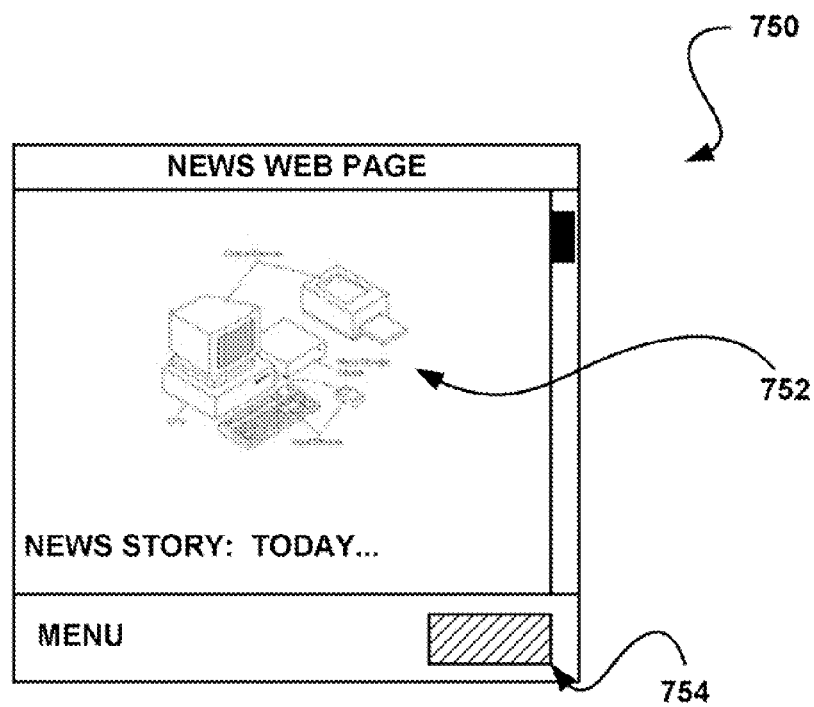
FIG. 7B shows a graphical user interface in which requested data is loaded, in accordance with yet another embodiment.

FIG. 7B shows a graphical user interface (GUI) 750 in which requested data is loaded, in accordance with yet another embodiment. As an option, the GUI 750 may be implemented in the context of the architecture and environment of FIGS. 1-6. Of course, however, the GUI 750 may be implemented in any desired environment. It should also be noted that the aforementioned definitions may apply during the present description.

As shown, the GUI 700 is utilized to display data requested by a user over a network. In response to a determination that a data transfer rate of an associated device is meets a predefined threshold rate, an entirety of the requested data is loaded utilizing an associated network browser. Thus, an image 752 associated with the requested data is displayed, as shown.

In addition, a status indicator 754 is included in the GUI 700 for indicating that the entirety of the requested data has been loaded, that the data transfer rate of an associated device meets the threshold rate, etc. For example, a predetermined color may be utilized for providing such indication via the status indicator 754.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method, comprising:
    identifying a data transfer rate associated with a device connected to a network;
    conditionally loading a portion of data associated with e-mail from the network utilizing a network browser of the device, based on the identified data transfer rate, wherein the portion of the data is selected for loading based on a relevancy of the portion of the data as indicated by a plurality of rules, the rules assigning text data as having a higher relevancy and advertising data as having a lower relevancy for loading;
    issuing a command to prevent at least some of the data from being loaded based, at least in part, on its corresponding relevancy and the identified data transfer rate being lower than a specified threshold rate;
    generating an average for a plurality of previous transfer rates for the device over a period of time;
    comparing the average for the plurality of previous transfer rates to a predefined threshold rate; and
    loading an entirety of requested data if the average for the plurality of previous transfer rates exceeds the predefined threshold rate.

2. The method of claim 1, wherein the data transfer rate is identified utilizing a network controller.

3. The method of claim 1, further comprising continuously monitoring the data transfer rate.

4. The method of claim 1, wherein the data transfer rate indicates a speed with which data is transferred to the device via the network.

5. The method of claim 1, wherein the data includes a web page.

6. The method of claim 1, wherein the data includes an electronic mail message.

7. The method of claim 1, wherein the rules are user-configured.

8. The method of claim 1, wherein the rules are automatically configured.

9. The method of claim 8, wherein the rules are configured automatically based on capabilities of the device.

10. The method of claim 1, wherein the portion of the data includes an image.

11. The method of claim 1, wherein the portion of the data is associated with a third party plug-in.

12. The method of claim 1, wherein the portion of the data includes an advertisement.

13. The method of claim 1, wherein the portion of the data is loaded if the identified data transfer rate meets a specified threshold rate.

14. The method of claim 1, wherein, in response to the portion of the data being prevented from loading based on the identified data transfer rate, the portion of the data is loaded based on a manual selection.

15. The method of claim 1, further comprising presenting an alert in response to prevention of the loading of the portion of the data.

16. A computer program product embodied on a non-transitory computer readable medium for performing operations, comprising:
    identifying a data transfer rate associated with a device connected to a network;
    conditionally loading a portion of data associated with e-mail from the network utilizing a network browser of the device, based on the identified data transfer rate, wherein the portion of the data is selected for loading based on a relevancy of the portion of the data as indicated by a plurality of rules, the rules assigning text data as having a higher relevancy and advertising data as having a lower relevancy for loading;
    issuing a command to prevent at least some of the data from being loaded based, at least in part, on its corresponding relevancy and the identified data transfer rate being lower than a specified threshold rate;
    generating an average for a plurality of previous transfer rates for the device over a period of time;
    comparing the average for the plurality of previous transfer rates to a predefined threshold rate; and
    loading an entirety of requested data if the average for the plurality of previous transfer rates exceeds the predefined threshold rate.

17. A system, comprising:
    a processor;
    a network adapter, wherein the system is configured for:
        identifying a data transfer rate associated with a device connected to a network;
        conditionally loading a portion of data associated with e-mail from the network utilizing a network browser of the device, based on the identified data transfer rate, wherein the portion of the data is selected for loading based on a relevancy of the portion of the data as indicated by a plurality of rules, the rules assigning text data as having a higher relevancy and advertising data as having a lower relevancy for loading;
        issuing a command to prevent at least some of the data from being loaded based, at least in part, on its corresponding relevancy and the identified data transfer rate being lower than a specified threshold rate;
        generating an average for a plurality of previous transfer rates for the device over a period of time;
        comparing the average for the plurality of previous transfer rates to a predefined threshold rate; and
        loading an entirety of requested data if the average for the plurality of previous transfer rates exceeds the predefined threshold rate.

18. The system of claim 17, wherein the device includes memory coupled to a processor via a bus.

19. The method of claim 1, wherein the portion of the data includes text within email messages accessed utilizing an email application, where the text within the email messages is specified as a higher relevancy than images within the email messages.

* * * * *